(12) United States Patent
Lee

(10) Patent No.: US 7,880,629 B2
(45) Date of Patent: Feb. 1, 2011

(54) POWER SUPPLY DEVICE

(75) Inventor: Tsung-Hsi Lee, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 12/329,606

(22) Filed: Dec. 7, 2008

(65) Prior Publication Data
US 2010/0109891 A1 May 6, 2010

(30) Foreign Application Priority Data
Nov. 5, 2008 (CN) .................. 2008 1 0305380

(51) Int. Cl.
*G08B 21/00* (2006.01)
(52) U.S. Cl. .................. 340/638; 340/639; 340/641; 340/642; 340/644; 361/626
(58) Field of Classification Search .................. 340/638, 340/639, 641, 642, 644, 636.1; 361/600, 361/626, 641, 642
See application file for complete search history.

(56) References Cited

U.S. PATENT DOCUMENTS

| | | | |
|---|---|---|---|
| 5,969,602 A * | 10/1999 | Marks ..................... | 340/467 |
| 5,986,558 A * | 11/1999 | Crawford et al. .......... | 340/638 |
| 6,617,973 B1 * | 9/2003 | Osterman ................ | 340/636.1 |
| 7,123,156 B2 * | 10/2006 | Sadjadi ................... | 340/638 |
| 7,633,400 B2 * | 12/2009 | Coffey et al. ............ | 340/638 |

FOREIGN PATENT DOCUMENTS

| CN | 1267114 A | 9/2000 |
|---|---|---|
| CN | 1755867 A | 4/2006 |

\* cited by examiner

*Primary Examiner*—Davetta W Goins
(74) *Attorney, Agent, or Firm*—Frank R. Niranjan

(57) ABSTRACT

A power supply device for supplying power to a communication device includes a power source, a first fuse, a second fuse, a voltage converter, a photo coupler, and a central processing unit (CPU). The voltage converter is configured for receiving first power signals from the power source via the first fuse and the second fuse, and converting the first power signals to second power signals. The photo coupler connected in parallel to the third resistor, configured for outputting a first electrical signal upon the condition that the first fuse and the second fuse are operational, and outputting a second electrical signal upon the condition that at least one of the first fuse and the second fuse is blown. The CPU is connected to the photo coupler, configured for generating an alarm message upon receiving the second electrical signal from the photo coupler.

6 Claims, 1 Drawing Sheet

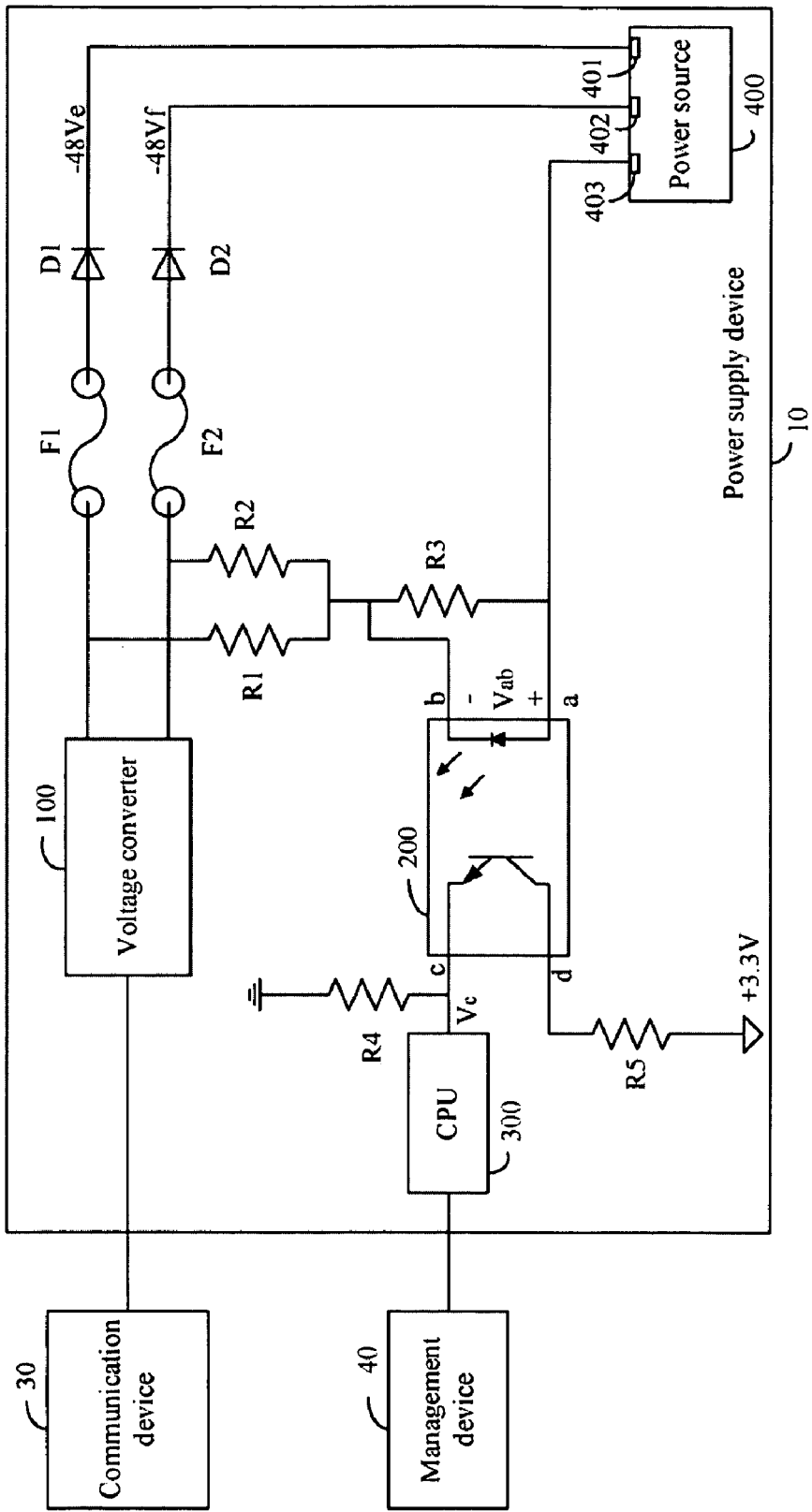

POWER SUPPLY DEVICE

BACKGROUND

1. Technical Field

Embodiments of the present disclosure relate to communication power sources, and particularly to a power supply device.

2. Description of Related Art

A power supply device for supplying power to a communication device often uses two fuses to limit current. The power supply device can normally supply power to the communication device when the two fuses are operational or only one of the two fuses is operational. The power supply device cannot supply power to the communication device when the two fuses are blown.

Generally, maintenance operators cannot know if one of the two fuses is blown because the power supply device continues to supply power to the communication device. Maintenance operators will only know when both fuses have blown if the power supply device cannot supply power to the communication device, and then they must replace the blown fuses with new fuses, which means downtime for the communication device.

BRIEF DESCRIPTION OF THE DRAWINGS

The FIGURE is a schematic diagram of an application environment and a circuit diagram of one embodiment of a power supply device in accordance with the present disclosure.

DETAILED DESCRIPTION OF CERTAIN INVENTIVE EMBODIMENTS

The FIGURE is a schematic diagram of an application environment and a circuit diagram of one embodiment of a power supply device 10 in accordance with the present disclosure. In one embodiment, the power supply device 10 supplies power to a communication device 30, and uses two fuses to limit current drawn by the communication device 30. The power supply device 10 can detect if either one of the two fuses is blown even when power is still being supplied to the communication device 30, thus preventing downtime when both fuses have blown.

The power supply device 10 includes a first fuse F1, a second fuse F2, a first resistor R1, a second resistor R2, a third resistor R3, a voltage converter 100, a photo coupler 200, a central processing unit (CPU) 300, and a power source 400.

The power source 400, the first fuse F1, and the voltage converter 100 co-operatively form a first path for supplying power to the communication device 30. The power source 400, the second fuse F2, and the voltage converter 100 co-operatively form a second path for supplying power to the communication device 30. In one embodiment, one of the first and the second paths can supply power to the communication device 30 when the other one is broken.

The power source 400 includes a first negative pole 401, a second negative pole 402, and a positive pole 403. In one embodiment, the power source 400 may be a battery.

The first fuse F1 is connected to the first negative pole 401 of the power source 400, for limiting current flowing through the first path. The first fuse F1 automatically opens the first path when the current flowing through the first path becomes too great.

The second fuse F2 is connected to the second negative pole 402 of the power source 400, for limiting current flowing through the path. The second fuse F2 automatically opens the second path when the current flowing through the second path becomes too great.

The voltage converter 100 is connected between the first fuse F1, the second fuse F2, and the communication device 30, for receiving first power signals from the power source 400 via the first fuse F1 and the second fuse F2, and converting the first power signals to second power signals. The second power signals provide sufficient power for operating the communication device 30. In one embodiment, the voltage converter 100 may be a direct current (DC) to DC voltage converter, for converting DC signals received from the power source 400 from one voltage level to another voltage level, so as to become, for example, 3.3V DC signals for driving the communication device 30.

A first end of the first resistor R1 is connected to a joint of the first fuse F1 and the voltage converter 100. A first end of the second resistor R2 is connected to a joint of the second fuse F2 and the voltage converter 100, and a second end of the second resistor R2 is connected to a second end of the first resistor R1. A first end of the third resistor R3 is connected to a joint of the first resistor R1 and the second resistor R2, and a second end of the third resistor R3 is connected to the positive pole 403 of the power source 400.

The photo coupler 200 is connected in parallel to the third resistor R3, for outputting a first electrical signals upon the condition that the first fuse F1 and the second fuse F2 are operational, and outputting a second electrical signal upon the condition that at least one of the first fuse F1 and the second fuse F2 are blown.

The CPU 300 is connected to the photo coupler 200, for generating an alarm message upon receiving the second electrical signal from the photo coupler 200 indicating at least one of the first fuse F1 and the second fuse F2 is blown. In one embodiment, the photo coupler 200 outputs the second electrical signal to the CPU 300 indicating at least one of the first fuse F1 and the second fuse F2 is blown, and subsequently the CPU 300 notifies a management device 40 to alert maintenance operators to replace the blown fuse.

In another embodiment, the power supply device 10 may further include a pull-down resistor R4 and a pull-up resistor R5. The pull-down resistor R4 is connected between the photo coupler 200 and ground. The pull-up resistor R5 is connected between the photo coupler 200 and a reference voltage. In one embodiment, the reference voltage may be +3.3V.

The photo coupler 200 includes a first input a, a second input b, a first output c, and a second output d. The first input a and the second input b are connected to two ends of the third resistor R3. The first output c is connected to one end of the pull-down resistor R4 and the CPU 300. The second output d is connected to one end of the pull-up resistor R5.

The power supply device 10 may further include a first diode D1 and a second diode D2. An anode of the first diode D1 is connected to the first fuse F1, and a cathode of the first diode D1 is connected to the first negative pole 401 of the power source 400. An anode of the second diode D2 is connected to the second fuse F2, and a cathode of the second diode D2 is connected to the second negative pole 402 of the power source 400. The first diode D1 and the second diode D2 are capable of preventing interference between the two paths.

In one example of the present disclosure, it is assumed that a voltage of the power source 400 is −48V, and the reference voltage connected to the pull-up resistor R5 is +3.3V. If the first fuse F1 and the second fuse F2 are operational, voltage Vab between the first input a and the second input b of the photo coupler 200 is calculated according to the following formula:

$$Vab=48Ve*(R3/(R1+R3))+48Vf*(R3/(R2+R3))$$

According to the previous formula, by selecting appropriate resistance values for R1, R2, R3, voltage Vab can be greater than a turn-on voltage of the photo coupler 200 so as to turn on the photo coupler 200. In such case, due to the pull-up resistor R5, voltage Vc is equal to +3.3V, that is, the photo coupler 200 outputs a +3.3V high voltage signal. Then, the CPU 300 receives the +3.3V high voltage signal, and accordingly knows that the first fuse F1 and the second fuse F2 are operational.

In another example of the present disclosure, it is assumed that a voltage of the power source 400 is −48V, and the reference voltage connected to the pull-up resistor R5 is +3.3V. If the first fuse F1 is operational and the second fuse F2 is blown, voltage Vab between the first input a and the second input b of the photo coupler 200 is calculated according to the following formula:

$$Vab=48Ve*(R3/(R1+R3))$$

According to the previous formula, by selecting appropriate resistance values for R1, R3, voltage Vab can be smaller than the turn-on voltage of the photo coupler 200 so as to turn off the photo coupler 200. In such case, due to the pull-down resistor R4, voltage Vc is equal to 0V, that is, the photo coupler 200 outputs a 0V low voltage signal. The CPU 300 receives the 0V high voltage signal, and accordingly knows that at least one of the first fuse F1 and the second fuse F2 is blown. The CPU 300 then notifies the management device 40 to alert maintenance operators to replace the blown fuse.

It should be noted that the example in which the first fuse F1 is blown and the second fuse F2 is operational is similar to when the first fuse F1 is operational and the second fuse F2 is blown, so description is omitted.

Thus, the power supply device 10 can detect if either the first fuse F1 or the second fuse F2 are blown even power is still being supplied to the communication device 30, so as to avoid downtime of the communication device 30.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A power supply device for supplying power to a communication device, comprising:
   a power source comprising a first negative pole, a second negative pole, and a positive pole;
   a first fuse connected to the first negative pole;
   a second fuse connected to the second negative pole;
   a voltage converter connected between the first fuse, the second fuse, and the communication device, configured for receiving first power signals from the power source via the first fuse and the second fuse, and converting the first power signals to second power signals, wherein the second power signals provide sufficient power for operating the communication device;
   a first resistor, a first end of the first resistor being connected to a joint of the first fuse and the voltage converter;
   a second resistor, a first end of the second resistor being connected to a joint of the second fuse and the voltage converter, a second end of the second resistor being connected to a second end of the first resistor;
   a third resistor, a first end of the third resistor being connected to a joint of the first resistor and the second resistor, a second end of the third resistor being connected to the positive pole of the power source;
   a photo coupler connected in parallel to the third resistor, configured for outputting a first electrical signal upon the condition that the first fuse and the second fuse are operational, and outputting a second electrical signal upon the condition that at least one of the first fuse and the second fuse are blown; and
   a central processing unit (CPU) connected to the photo coupler, configured for generating an alarm message upon receiving the second electrical signal from the photo coupler.

2. The power supply device of claim 1, further comprising:
   a pull-up resistor connected between the photo coupler and a reference voltage; and
   a pull-down resistor connected between the photo coupler and ground.

3. The power supply device of claim 2, wherein the photo coupler comprises a first input, a second input, a first output, and a second output, the first input and the second input are connected to the first and second ends of the third resistor, the first output is connected to the pull-down resistor and the CPU, and the second output is connected to the pull-up resistor.

4. The power supply device of claim 3, wherein the photo coupler outputs a high voltage signal upon the condition that the first fuse and the second fuse are operational, and outputs a low voltage signal upon the condition that at least one of the first fuse and the second fuse is blown.

5. The power supply device of claim 4, wherein the CPU is further for generating an alarm message upon receiving the low voltage signal from the photo coupler.

6. The power supply device of claim 1, further comprising:
   a first diode, an anode of the first diode being connected to the first fuse, a cathode of the first diode being connected to the first negative pole of the power source; and
   a second diode, an anode of the second diode being connected to the second fuse, a cathode of the second diode being connected to the second negative pole of the power source;
   wherein the first diode and the second diode are capable of preventing interference between a power supply path with the first diode and a power supply path with the second diode.

* * * * *